March 9, 1954 R. A. SANDBERG 2,671,361
APPARATUS FOR SECURING TOGETHER A PLURALITY OF SHEETS
Filed July 6, 1950 2 Sheets-Sheet 1
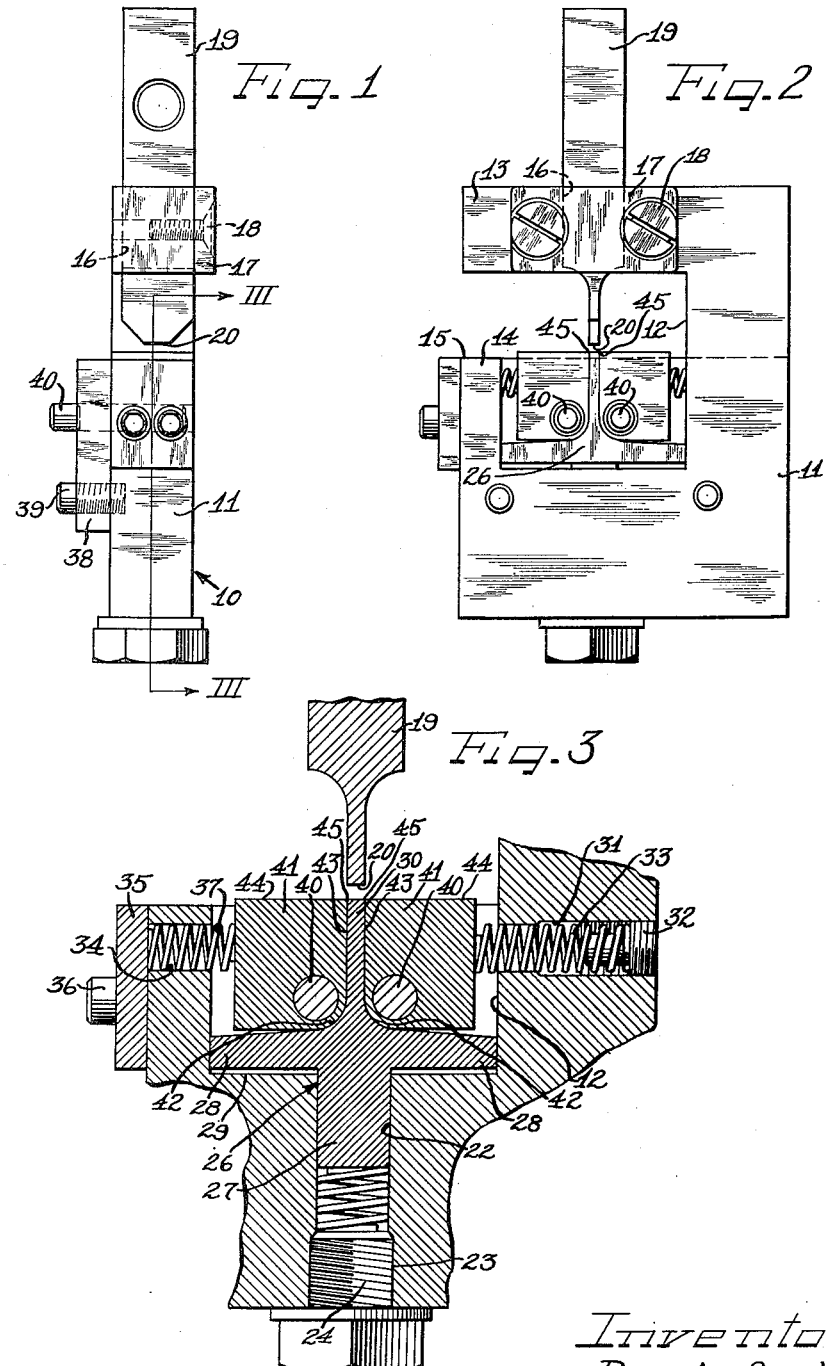
Inventor
Ray A. Sandberg March 9, 1954 R. A. SANDBERG 2,671,361
APPARATUS FOR SECURING TOGETHER A PLURALITY OF SHEETS
Filed July 6, 1950 2 Sheets-Sheet 2
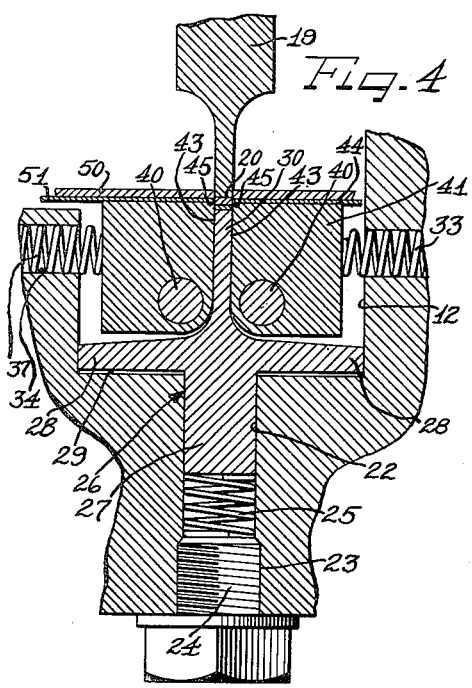
Inventor
Ray A. Sandberg

UNITED STATES PATENT OFFICE 2,671,361

APPARATUS FOR SECURING TOGETHER A PLURALITY OF SHEETS

Ray A. Sandberg, Waukegan, Ill., assignor to Houdaille-Hershey Corporation, Detroit, Mich., a corporation of Michigan Application July 6, 1950, Serial No. 172,365

3 Claims. (Cl. 78—1)

The present invention relates to an apparatus for and method of fastening. More particularly, the present invention relates to apparatus for the fastening together of a pair of sheet-like members in abutting surface contact by the shearing of corresponding portions of the members, the forcing of the sheared portions from the plane of the members, and the later lateral expansion of the sheared portions to prevent re-entry of the sheared portions through the shearing apertures.

Although the prior art has suggested the fastening together of surface contacting sheet-like members by the shearing of superimposed portions of each of the members and the later deformation of the sheared portions, the prior art has failed to provide apparatus which is capable of adoption to mass production techniques.

The present invention now provides a simple, easily employed, inexpensive apparatus which may be rapidly and substantially automatically operated to carry out the shearing and the deformation or swaging step of the method as a continuous operation. The method of the present invention is advantageous since it permits the carrying out of the continuous operation without the necessity of manually manipulating the apparatus, thereby eliminating expensive hand operation.

More particularly, the apparatus of the present invention comprises generally a movable shearing punch adapted to be actuated by suitable source of power towards and away from a complementary shearing and swaging die. The die takes the form of a pair of support blocks for supporting the articles to be joined and having spaced edges which provide die cutting edges. The cutting edges are urged toward one another and a spacer or anvil member is interposed between the die edges while being adapted for movement in the plane of movement of the shearing punch.

The operation of the apparatus involves first the actuation of the shearing punch for cooperation with the shearing edges of the support members to form registering, substantially coextensive apertures in the members to be fastened. Continued movement of the shearing punch after shearing has been accomplished urges the sheared area of the members to be fastened through the sheared apertures beyond both of the members to be fastened. After such movement of the sheared areas has occurred, these areas are bottomed against the anvil and continued movement of the shearing punch swages or otherwise deforms the sheared areas laterally by virtue of their vertical confinement between the shearing punch and the anvil.

This confinement of the sheared areas in the direction of movement of the shearing punch forces metal from the sheared area laterally outwardly toward the shearing edges of the die, and movement of these edges laterally of the shearing punch and the anvil accommodates such spreading movement, or more accurately the lateral flow, of the metal of the sheared portion. Such lateral metal flow prevents re-entry of the sheared portion through the sheared apertures, thereby effectively securing together the members to be fastened. If desired, the anvil member may then be actuated following withdrawal of the shearing punch of the shearing apertures to force the laterally expanded portions of the members from their position between the shearing edges, thereby removing the members from the apparatus.

It is, therefore, an important object of the present invention to provide an improved apparatus for fastening together a pair of superimposed sheet-like members by the shearing and swaging of portions of the members as a series of consecutive continuous operations.

Another important object of the present invention is to provide an apparatus for fastening together a pair of members in face-to-face relation, including a movable shearing punch and means providing a pair of cutting edges co-operating with the punch to shear the members to be fastened, the means being laterally shiftable to accommodate lateral expansion between the cutting edges of those portions sheared from the members to be fastened.

It is a further important object of the present invention to provide apparatus for the fastening together of a pair of members in abutting surface contact, including cooperating shearing surfaces formed on a shearing punch and on a pair of spaced support blocks, the surfaces of the blocks being resiliently urged toward one another for cooperation with the punch to shear the members to be fastened and being movable laterally following shearing to accommodate lateral expansion of the sheared portions, thereby preventing re-entry of these portions through the sheared apertures.

Still another important object of the present invention is to provide apparatus for the fastening together of a pair of superimposed metallic sheet members including a vertically movable shearing punch, a cooperating anvil resiliently urged toward the punch, the punch and anvil receiving therebetween the members to be secured, and a pair of support blocks adapted to receive thereon the members to be secured, the blocks having transverse cutting edges for cooperation with the shearing punch to shear the members to be fastened and the anvil serving to bottom the sheared portions, with continued movement of the punch deforming the sheared portions laterally and this lateral deformation being accommodated by lateral relative separation of the cutting edges.

Yet another important object of the present invention is the provision of a method of fastening together a pair of superimposed abutting members, including the shearing of the members by the cooperation of a movable punch press and a pair of closely spaced shearing edges, the bottoming of the sheared portions against an anvil with continued movement of the shearing punch causing lateral spreading of the sheared portions and relative movement of the cutting edges to accommodate such lateral spreading.

Other and further important objects of this invention will be apparent from the disclosures in the specification and the accompanying drawings. This invention is illustrated in the drawings and hereinafter more fully described.

On the drawings:

Figure 1 is an end elevational view of an apparatus of the present invention;

Figure 2 is a side elevational view of the apparatus of Figure 1;

Figure 3 is an enlarged fragmentary sectional view, with parts shown in elevation, taken along the plane III—III of Figure 1;

Figure 4 is a sectional view similar to Figure 3 illustrating shearing of the members to be fastened;

Figure 5 is a view similar to Figures 3 and 4 and illustrating a later stage in the operation of the apparatus in which the sheared portions are laterally spread;

Figure 6 is a greatly enlarged sectional view of the members secured together; and Figure 7 is an enlarged sectional view taken along the plane VII—VII of Figure 5.

As shown on the drawings:

In Figures 1 and 2, reference numeral 10 refers generally to an apparatus of the present invention including a generally rectangular frame 11 provided with a single aperture 12 defined by an upper horizontal frame leg 13 overlying the aperture and cooperating with a lower upstanding arm 14 to define a side aperture 15 communicating with the central aperture 12.

The upper leg 13 is recessed, as at 16, and a cover plate 17 is mounted over the recess 16, as by screws 18, to close the recess and to journal therein for reciprocal movement an upstanding shearing punch 19 having a depending terminal shearing edge 20. As best shown in Figure 7, the cutting edge 20 is of less length than the corresponding dimension of the punch 19 and is joined thereto by forwardly and outwardly sloping side edges 21.

That lower portion of the frame 11 underlying the aperture 12 is provided with a central bore 22 (Figures 3-5) having a threaded open lower end 23 within which a threaded stud 24 is positioned. A compression spring 25 is bottomed against the stud 24 and an anvil 26 provided with a depending boss 27 snugly fitting within the bore 22 is bottomed against the spring 25. The anvil 26 is provided with a central portion formed integrally with the boss 27 and having lateral oppositely directed flanges 28 overlying the bottom walls 29 of the aperture 12. A generally rectangular upstanding projection or rib 30 is provided on the anvil 26 to project upwardly beyond the flanges 28 toward the shearing punch 19 positioned thereabove, as hereinbefore described.

An upstanding side arm of the frame 11 opposite the arm 14 and adjacent the anvil projection 30 is provided with a bore 31 within which there is threadedly retained a stud 32 having a compression spring 33 bottomed thereagainst. A similar bore 34 in the arm 14 is covered by a plate 35 secured thereto by suitable means, as by screws 36, and a spring 37 is confined within the bore 34 to be bottomed against the plate 36.

An additional cover plate 38 is secured to the frame 11 by screws 39 to overlie the lower portion of the aperture 12, the plate carrying therethrough a pair of parallel elongated pivot pins 40 extending transversely across the aperture 12, the pins being closely spaced on each side of the projection 30 of the anvil 26.

The pins 40 each carries a support block 41 rotatable about the pins, each of the blocks being rotatable about its pin and each contacting the free end of the corresponding spring 33—37. The blocks 41 are generally rectangular in configuration and are provided with lower rounded corners 42 and upstanding side walls 43 in closely mating engagement with the upstanding projection 30 of the anvil 26 when the blocks are urged thereagainst under the influence of the springs 33—37. The blocks 41 are also each provided with plain upper surfaces 44 which are adapted to receive thereon a pair of superimposed members 50 and 51 to be secured together as best illustrated in Figures 4 and 5. The blocks are provided with sharp right angle edges 45 defined by the top surfaces 44 of the blocks and the side walls 43 thereof, and these edges 45 directly underlie the cutting edge 20 of the shearing punch 19.

From the foregoing arrangement of the parts it will be seen that movement of the blocks toward one another is limited by the anvil projection 30 therebetween which serves as a spacing element, but movement of the blocks 41 about the pins 40 against the action of the springs 37 and away from one another is limited only by the resiliency of the compression spring. Further, it will be seen since the anvil 26 is capable of limited downward movement against the compression spring 25, this movement is limited by abutment of the undersurface of the flanges 28 with the corresponding bottom surface 29 of the aperture 12.

The operation of the apparatus hereinbefore described will be evident from Figures 4 and 5 of the drawings.

In Figure 4, the shearing punch 19 has been actuated by a suitable source of power and the shearing punch in cooperation with the shearing edges 45 of the blocks 41 accomplishes the shearing of corresponding portions 50a—50b from a pair of members 50 and 51 to be secured together. The members 50 and 51 are initially placed upon the upper surface 44 of the blocks 41 in such position to be interposed between the anvil 26 and the shearing punch. It will be seen that, as shearing is accomplished, the anvil 26 is moved downwardly against the spring 25 under the shearing force imparted to the shearing punch.

During such shearing the blocks 41 will not be subject to any lateral force component, so that the cutting edges 45 will be retained in proper cutting alignment with the cutting edge 20 of the shearing punch. Thus, shearing may be rapidly and continuously accomplished. In Figure 7 of the drawings the formation of the aperture formed within the members 50 and 51 is illustrated and it will be seen that the actual line of shear occurs at the shearing edges with the rearward and forward portions of the sheared areas remaining joined to the plates or sheets 50—51, as at 52—53, respectively.

In Figure 5 there is illustrated a later step in the fastening process which takes place immediately upon the shearing of the areas 50a and 50b from the plates 50—51. In this stage of the process, the anvil flanges 28 are bottomed against the bottom 29 of the aperture 12, and further movement of the shearing punch toward the anvil results in the confinement of the sheared portions 50a—50b therebetween with lateral flow occurring outwardly from the sheared portions, as at 54—53, respectively.

This lateral metal flow is illustrated in Figure 5 of the drawings, and as shown it forces the blocks 41 to pivot about the pins 40, thereby laterally spreading the shearing edges 45 of the blocks, this movement of the blocks causing compression of the springs 33 and 37. The portions 50a and 50b, which have been previously sheared from the plates 50 and 51, are thus swaged or otherwise deformed laterally outwardly, the final lateral dimension of the swaged portions being greater than the width of the initially sheared portions. Thus, the swaged and sheared portions cannot be forced back through the shearing apertures, effectively fastening the members 50 and 51 together.

The vertical distance through which the sheared portions are displaced prior to swaging is the same as that distance between the bottom surface of the anvil flanges 28 and the bottom 29 of the recess 12 when the anvil flanges are fully urged against the bottom surfaces of the blocks 41 by the spring 25. This vertical distance is at least equal to the combined thickness of the pair of plates 50—51 and may be slightly greater if desired.

It will be understood by those skilled in the art that the shearing punch 19 serves a dual function. First it cooperates with the edges 45 of the blocks 40 to shear corresponding portions of the members 50 and 51, and then the punch serves as a swaging or upsetting punch after the anvil has become fully bottomed within the supporting frame to deform the sheared portions laterally of the punch. The anvil 26 serves as a bottoming member for the swaging die, as a spacer for the blocks 41, and as an ejector or stripper upon the removal of the punch A and upward urging of the anvil under the force of the compression spring 25.

In Figure 6 there is illustrated, in cross-sectional detail, the union between the plates 50 and 51. It will be seen that the sheared portions 50a and 50b have been deformed vertically beyond the bottom member 51 and that the portions 50a and 50b have been laterally spread, as at 54—55 respectively, so as to underlie the sheared edges of these members, thus preventing re-entry of the sheared portions through the shearing aperture.

The method of the present invention contemplates the shearing of corresponding portions of a pair of superimposed members by confinement of the members between a shearing punch and cooperating shearing edges, the supporting of the portions sheared from the members to be fastened, the lateral spreading of the sheared portions under pressure from the shearing punch, and the lateral spreading of the shearing edges to accommodate such spreading movement of the sheared portions against the bias of resilient means urging the shearing edges toward one another.

It will be understood that modifications and variations may be effected without departing from the scope of the novel concepts of the present invention.

I claim as my invention:

1. In an apparatus for securing together a plurality of sheets in abutting surface contact with one another through interlocking of material of the sheets themselves, a shearing punch having a terminal face providing cutting edges, an anvil having a surface opposed to said terminal face, means guiding said anvil for movement of said anvil toward and away from said punch and in alignment therewith, anvil resilient means urging said anvil toward said punch, a die member positioned on each side of said anvil for supporting superimposed sheets and having shearing edges for cooperating with said punch cutting edges, means securing the die members against substantial motion in the direction of movement of said anvil, said punch being movable toward said anvil to shear the portion of the sheets spanning between said die member shearing edges and to drive the sheared portion against said resiliently urged anvil to depress the anvil from its initial position against the opposition of said anvil resilient means, the resiliently urged anvil acting as a pressure pad to hold said sheared sheet portion against said punch terminal face, means rigidly bottoming said anvil after a predetermined displacement of the sheared sheet portion from the plane of said sheets, said punch being thereafter operative to press said sheared sheet portion against the rigidly bottomed anvil to spread said sheared sheet portion laterally, means mounting said die members for lateral movement away from said anvil upper surface to accommodate lateral spreading of the sheared sheet portion, and die member resilient means urging said die member toward each other and accommodating lateral spreading of the sheared sheet portion, and said anvil resilient means acting to restore said anvil to initial position and to eject the sheared sheet portion from between said die members, said anvil thereby functioning automatically and successively as a pressure pad, an anvil and an ejector during each securing operation.

2. In an apparatus for securing together a plurality of sheets in abutting surface contact with one another through interlocking of material of the sheets themselves, a shearing punch having a terminal face providing cutting edges, a stationary frame mounting said punch for reciprocal movement, an anvil having a plane surface opposed to said terminal face, said anvil having an extension forming a pilot and having intermediate laterally extending arms, said frame having means guiding said pilot for movement of said anvil toward and away from said punch and in alignment therewith, anvil resilient means urging said anvil toward said punch, die members positioned on each side of said anvil and normally in contact therewith and flush with the upper surface of said anvil to provide shearing edges cooperating with said punch cutting edges upon movement of said punch toward said anvil to shear a portion of the sheets confined therebetween, means securing the die members against substantial motion in the direction of movement of said punch and anvil, said punch being movable toward said anvil to shear said portion of said sheets and to drive said sheared portion against said resiliently urged anvil to depress the anvil from its initial position against the opposition of said anvil resilient means, the resiliently urged anvil acting as a pressure pad to hold said sheared sheet portion against said punch terminal face, means rigidly bottoming said lateral arms after a predetermined displacement of the sheared sheet portion from the plane of the sheets, said punch being operative to press said sheared sheet portion against the rigidly bottomed anvil to spread said sheared sheet portion laterally, means mounting said die members for lateral movement away from said anvil surface to accommodate lateral spreading of the sheared sheet portion, and die member resilient means urging said die members toward each other and accommodating lateral spreading of the sheared sheet portion, and said anvil resilient means acting to restore said anvil to initial position and to eject the sheared sheet portion from between said die members, said anvil thereby functioning automatically and successively as a pressure pad, a rigid anvil and an ejector during each securing operation.

3. In an apparatus for securing together a plurality of sheets in abutting surface contact with one another through interlocking of material of the sheets themselves, a shearing punch having a terminal face providing cutting edges, a stationary frame mounting said punch for reciprocal movement, an anvil having a plane surface opposed to said terminal face, said anvil having an extension forming a pilot and having intermediate laterally extending arms, said frame having means guiding said pilot for reciprocal movement of said anvil toward and away from said punch and in alignment therewith, anvil resilient means bottomed by said frame and acting on said extension to urge said anvil toward said punch, die blocks positioned on each side of said anvil and having side surfaces normally in contact therewith and having bottom surfaces normally engaging said anvil laterally extending arms to normally position said anvil with its surface flush with the upper surface of said die blocks, said die blocks having shearing edges adjacent and along said anvil surface for cooperating with said punch cutting edges upon movement of the punch toward the anvil to shear a portion of the sheets confined therebetween, pivot pins carried by said frame and mounting said blocks for lateral tilting movement away from said anvil surface but securing said blocks against substantial motion in the direction of said punch and anvil, said punch being movable between said die block shearing edges to shear a portion of the sheets and to drive said sheared portion against said resiliently urged anvil to depress the anvil from its initial position against the opposition of said resilient means, the resiliently urged anvil acting as a pressure pad to hold said sheared sheet portion against said punch terminal face, said frame having means rigidly bottoming said anvil lateral arms after a predetermined displacement of the sheared sheet portion from the plane of said sheets, said punch being thereafter operative to press said sheared sheet portion against the rigidly bottomed anvil to spread said sheared sheet portion laterally, die block resilient means urging said die blocks toward each other and accommodating lateral tilting movement of the die blocks about said pivot pins upon spreading of said sheared sheet portion, and said anvil resilient means acting to restore said anvil to initial position and to eject the sheared sheet portion from between said die blocks, said anvil thereby functioning automatically and successively as a pressure pad, an anvil and an ejector during each securing operation.

RAY A. SANDBERG.

References Cited in the file of this patent

UNITED STATES PATENTS

| Number | Name | Date |
|---|---|---|
| 512,021 | Gould | Jan. 2, 1894 |
| 977,178 | Ferguson | Nov. 29, 1910 |
| 2,254,558 | Williams | Sept. 2, 1941 |
| 2,288,308 | Williams | June 30, 1942 |
| 2,331,491 | Menkin | Oct. 12, 1943 |
| 2,585,047 | Scibelli | Feb. 12, 1952 |